(12) United States Patent
Nolin

(10) Patent No.: US 8,863,932 B1
(45) Date of Patent: Oct. 21, 2014

(54) METHOD, BAFFLE FREE ANGLE ADJUSTABLE APPARATUS AND SYSTEM FOR DELIVERING DRY BULK-FREE FLOWING MATERIAL INTO A CONTAINER

(76) Inventor: Karl W. Nolin, Spencer, IA (US)

( * ) Notice: Subject to any disclaimer, the term of this patent is extended or adjusted under 35 U.S.C. 154(b) by 218 days.

(21) Appl. No.: 13/283,156

(22) Filed: Oct. 27, 2011

Related U.S. Application Data

(60) Provisional application No. 61/491,732, filed on May 31, 2011.

(51) Int. Cl.
*B65G 69/18* (2006.01)

(52) U.S. Cl.
USPC ............................................ 193/32; 193/25 S

(58) Field of Classification Search
None
See application file for complete search history.

(56) References Cited

U.S. PATENT DOCUMENTS

| | | | | |
|---|---|---|---|---|
| 4,095,625 | A | * | 6/1978 | Marpe ............................. 141/93 |
| 4,342,383 | A | * | 8/1982 | Burnett ........................... 193/32 |
| 4,552,573 | A | | 11/1985 | Weis et al. |
| 4,569,432 | A | | 2/1986 | Zentgraf et al. |
| 4,603,769 | A | | 8/1986 | Bach et al. |
| 4,623,056 | A | | 11/1986 | Flaugher |
| 5,009,552 | A | | 4/1991 | Talcott |
| 5,286,155 | A | | 2/1994 | Straub |
| 5,454,490 | A | | 10/1995 | Johanson |
| 6,073,802 | A | | 6/2000 | Sampson et al. |
| 6,085,987 | A | | 7/2000 | Haraway |
| 6,131,443 | A | * | 10/2000 | Duncan ............................ 73/86 |
| 6,450,754 | B1 | * | 9/2002 | Catton .......................... 414/415 |
| 6,691,852 | B1 | * | 2/2004 | Nolin ............................ 193/2 A |
| 7,877,216 | B2 | * | 1/2011 | Wright et al. ................... 702/34 |

OTHER PUBLICATIONS

K&S Millwright sales catalog, copyright 2002; copy attatched.*
Willis, Fabricators of: Parts and Accessories for: Dry-Free Flowing Material Handling, pp. 157-158, Willis Distributing, Inc., Benton, Illinois.
"Material Handling Price Book", GSI Material Handling, Assumption, Illinois.
Brochure entitled "Grain Damage Prevention Chart 2001".
Brochure entitled "Elevator Accessories" by Ross Manufacturing Company, Brownsville, Tennessee.
Creamer Metal Products, Inc., London, Ohio.
Lambton Conveyor Flow System Accessories.
Seedburo brochure.

* cited by examiner

*Primary Examiner* — Ramya Burgess
*Assistant Examiner* — Lester Rushin
(74) *Attorney, Agent, or Firm* — Simmons Perrine Moyer Bergman PLC

(57) ABSTRACT

A system and method for changing a flow rate and direction of dry bulk material supplied from an elevated source, via an angled spout to an adjustable spout end having no internal baffles therein and having readily interchangeable wear pads therein which are accessible through an access door.

6 Claims, 4 Drawing Sheets

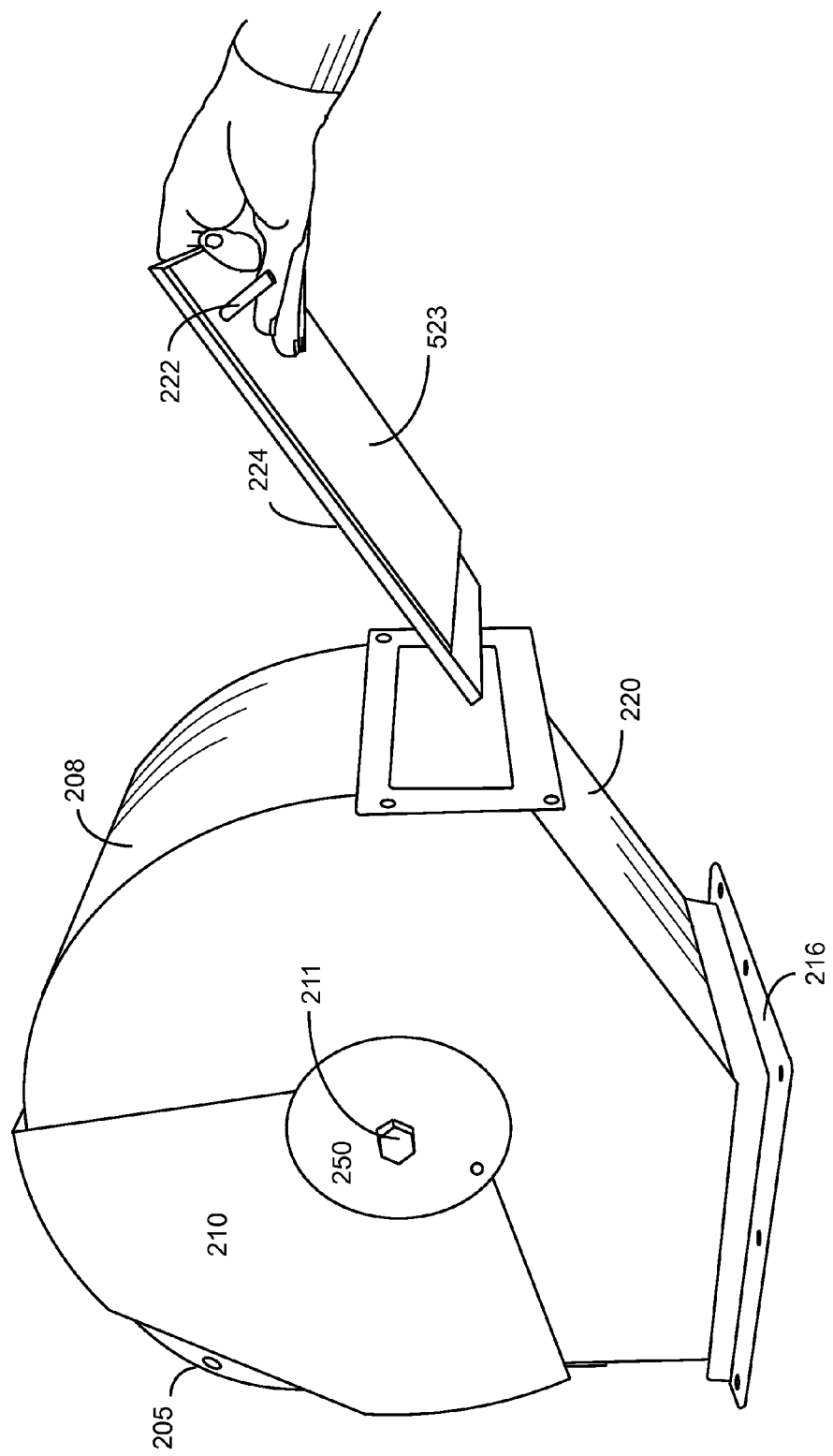

METHOD, BAFFLE FREE ANGLE ADJUSTABLE APPARATUS AND SYSTEM FOR DELIVERING DRY BULK-FREE FLOWING MATERIAL INTO A CONTAINER

FIELD OF THE INVENTION

The present invention generally relates to grain and dry bulk material handling, and more particularly relates to adjustable spout ends, and even more particularly relates to angle adjustable methods and systems for decelerating (i.e. slowing down and changing a flow direction of) dry bulk material.

BACKGROUND OF THE INVENTION

In recent years, grain elevators and feed mills have necessarily become increasingly efficient in their operations. Many customers of elevators and feed mills now operate on a "just-in-time" basis. Consequently, it is becoming increasingly important to minimize the duration of any elevator or mill downtime.

In the past, grain handling equipment manufacturers have sold adjustable spout ends which are placed at a lower end of an upwardly angled spout. The spout ends are typically disposed over the center of a grain bin, and the spout ends typically direct material into the center of the bin in a substantially vertical column. One example of such an adjustable spout end is the "Original Style" Adjustable Spout End another is the Premium Adjustable Spout End (U.S. Pat. No. 6,691,852) both of which are made by Nolin Milling, Inc. of Dickens, Iowa.

While these adjustable spout ends have enjoyed much success and have been used extensively in the past, they do have some drawbacks.

First of all, the effectiveness and efficiency of the Original Style adjustable spout ends generally operate optimally at a maximum spout flow rate. The Premium Adjustable spout end was better able to handle low and variable flow rates. Both of these prior art design suffered from getting plugged up when corn stalks, wheat straw, bean pods and other oversize material was present in the material being handled. Additionally, both styles often would require considerable effort and time be spent in replacing the adjustable spout end when wear caused damage necessitated a spout end change.

Consequently, there exists a need for improved methods and systems for providing, maintaining, repairing and replacing equipment for delivering and decelerating dry bulk material in an efficient manner.

SUMMARY OF THE INVENTION

It is an object of the present invention to provide an angle adjustable system and method for decelerating dry bulk material in an efficient manner.

It is a feature of the present invention to utilize a baffle-less angle adjustable input spout sleeve.

It is an advantage of the present invention to reduce a frequency of plugging caused by oversized matter in the material being handled.

It is another feature of the present invention to provide an access door and a removable wear pad.

It is another advantage of the present invention to reduce the time required to address substantial wear in the adjustable spout end.

The present invention is an apparatus and method for decelerating dry bulk material into a container, designed to satisfy the aforementioned needs, providing the previously stated objects, including the above-listed features, and achieves the already articulated advantages. The present invention is carried out in a "wasted time-less" manner in a sense that the time consumed in properly maintaining a functional spout end system, over its lifetime, has been greatly reduced.

Accordingly, the present invention is a system and method including an adjustable spout end having an oversized pivoting input sleeve with no internal baffles therein, but does include internal readily removable wear pads.

BRIEF DESCRIPTION OF THE DRAWINGS

The invention may be more fully understood by reading the following description of the preferred embodiments of the invention, in conjunction with the appended drawings wherein:

FIG. 5 is a perspective partially exploded representation of the adjustable spout end 108 of FIG. 1, shown in an orientation, as shown in FIG. 2.

DETAILED DESCRIPTION

Figure 1:
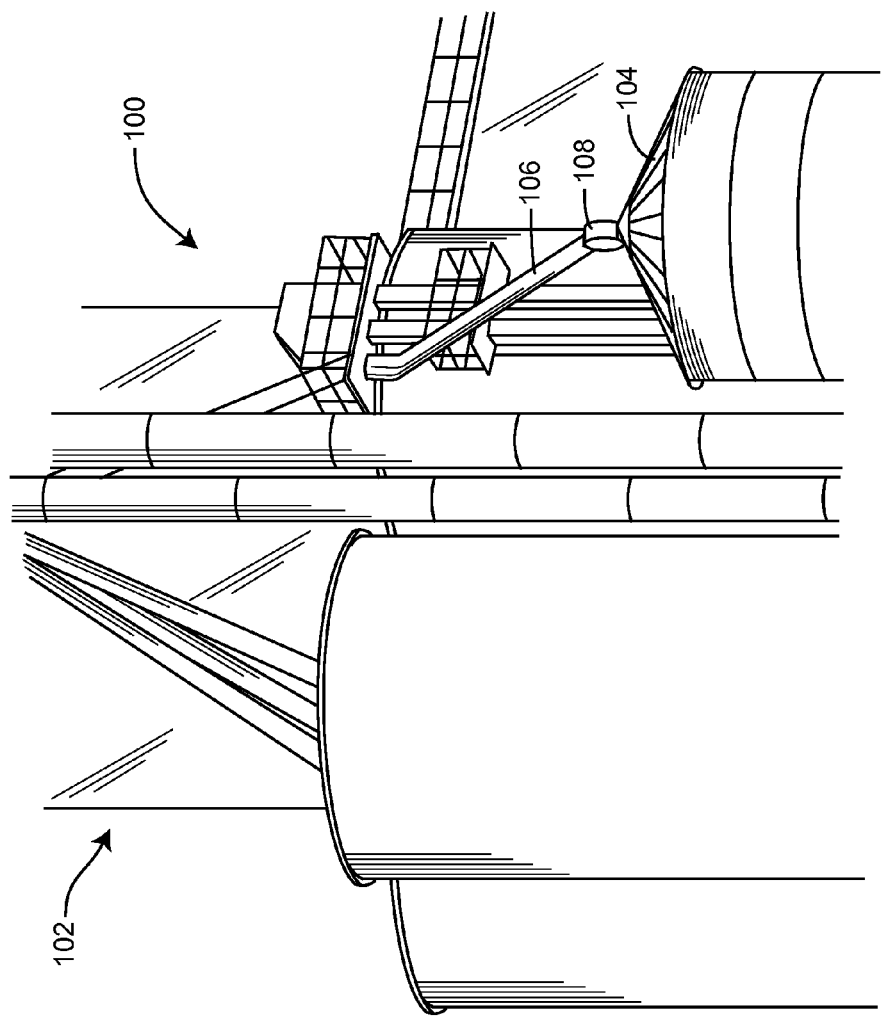
FIG. 1 is a perspective view of a grain elevator system of the present invention.

Now referring to the drawings wherein like numerals refer to like matter throughout, and more specifically referring to FIG. 1, there is shown a grain elevator system of the present invention generally designated 100, including an elevated position 102 from which grain or other dry bulk material is provided to a grain bin 104, via an angled gravity flow down spout 106 with a novel adjustable spout end 108 disposed at its lower end. The entire grain elevator system 100, except for adjustable spout end 108, is well known in the industry.

Figure 2:
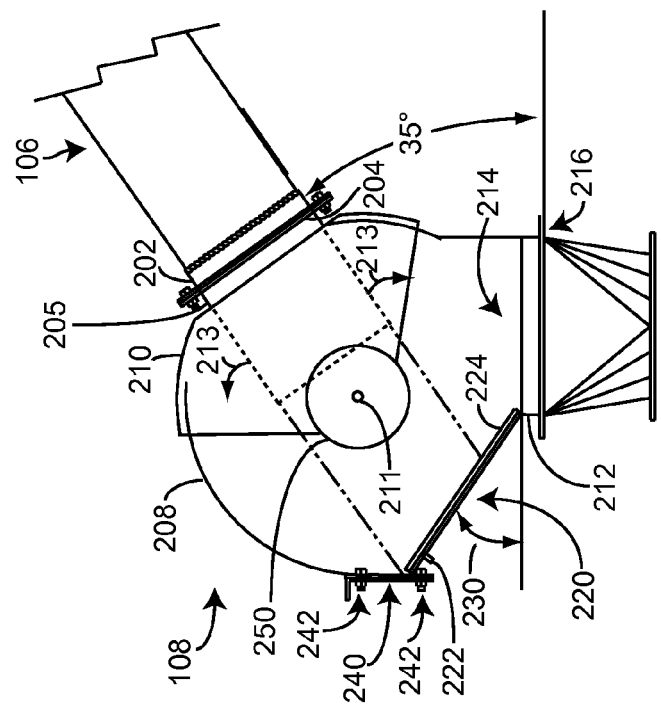
FIG. 2 is a more detailed partially cut-away view of the adjustable spout end 108 of FIG. 1, the dashed and dotted lines are included to show an imaginary projection of the end of angled gravity flow down spout 106.

Now referring to FIG. 2, there is shown a more detailed view of the adjustable spout end 108 of FIG. 1.

Angled gravity flow down spout 106 and oversized spout receiving ring 202 could be any shaped member, conduit, channel, pipe, tube, chute, shaft, such as, but not limited to, a square or round chute (FIG. 2). Various other shapes and configurations of angled gravity flow down spout 106 and oversized spout receiving ring 202 could be envisioned as well, so long as such other configurations permit angled gravity flow down spout 106 to be received into oversized spout receiving ring 202. In a preferred embodiment, angled gravity flow down spout 106 may have an exterior circumference of 8 inches, and the interior circumference of oversized spout receiving ring 202 would be slightly larger than 8 inches so as to allow angled gravity flow down spout 106 to easily slide into oversized spout receiving ring 202. In a preferred embodiment, angled gravity flow down spout 106 is gravity fed; however, in some instances, it may be desired to have some mechanism for assisting material in flowing through the spout, such as, but not limited to, a conveyor, auger or other material moving apparatus.

Oversized spout receiving ring 202 is shown having an oversized spout receiving ring bolting flange 204, which is orthogonal to the angle gravity flow down spout receiving portion of the oversized spout receiving sleeve 202, which flange 204 mates with another similar or identical flange 205. Oversized spout receiving sleeve 202 can be made of any suitable material, but it is preferred that it be made of the same material or a material with similar properties as the material of angled gravity flow down spout 106. In a preferred embodiment, oversized spout receiving sleeve 202 is a steel pipe. Angled gravity flow down spout 106 preferably extends into oversized spout receiving sleeve 202 by a predetermined sleeve penetration distance. The predetermined sleeve penetration distance can be variable, depending upon each particular application. Some of the factors which can be used to determine the predetermined penetration distance would be the amount of expansion and contraction of the grain bin 104 resulting from loading forces, as well as thermal expansion characteristics of grain bin 104, thermal coefficients of expansion of angled gravity flow down spout 106, measurement tolerances for cutting a length of angled gravity flow down spout 106, and other suitable factors.

Adjustable spout end 108 has an adjustable spout end main body 208 with a slot therein for receiving oversized spout receiving sleeve 202 at various angular orientations. Adjustable spout end main body 208 may be many shapes, but a shape of a thick substantially circular disk standing on edge may be preferred. The slot in the top edge of adjustable spout end main body 208 is covered by an adjustable spout end main body sliding top section 210, which is preferably pivotally mounted on a pin 211, which pivoting relationship, indicated by arrows 213, can be selectively enabled or disabled by tightening a tensioning nut 402 (FIG. 4) on said pin 211, which controls the pivoting of adjustable spout end main body sliding top section 210 with respect to adjustable spout end main body 208. Adjustable spout end main body sliding top section 210 preferably pivots between positions of 35 degrees and 60 degrees of the horizontal. Adjustable spout end main body 208 includes an adjustable spout end main body fixed bottom section 212, which has an adjustable spout end main body fixed bottom section material outlet opening 214, which is coupled to grain bin 104 (FIG. 1) via an adjustable spout end main body fixed bottom section bin attachment flange 216, preferably by bolting, but other suitable means of attachment may be substituted when desired. In a preferred embodiment, adjustable spout end main body 208 is made of steel and has an impact side 220 which is preferably 35 degrees off of horizontal or other angle such that all or nearly all of the material will clean out of the spout 108 when the incoming source is shut off. Material which exits angled gravity flow down spout 106 at either 35 degrees or 60 degrees or any angle in between, will slide up the sloped surface wear pad 224 which is deployed over impact side 220, up toward the access door 240 until the material loses momentum and then falls back forming a moving pile to form a shield of falling material to cushion the material now exiting the angled gravity flow down spout 106. This is all done without a need for a baffle, which has been known to create situations where obstructions are more likely to develop. Wear pad 224 are easily inspected and if necessary replaced through the access door 240. Wear pad 224 may come in a variety of different forms. For example, if the material flowing through the adjustable spout 108 is commercial corn or beans, the wear pad 224 may be a multi-ply design with a backer plate and a black rubber impact energy absorbing pad. For high volume commercial installations urethane might be used, for material such as fertilizer or rock abrasive resistant steel could be used. For molasses based feed ultra high molecular weight polyethylene (UHMW) could be used to reducing sticking. These variety and others types as well of wear pads 224 could be interchanged depending upon the material which is flowing and depending upon the velocity and flow volume rates of the material. Also the access door 240 could be a multi-ply material like the wear pad 224 or it could be covered with the same material as is used on the interior surface of the wear pad 224.

Figure 3:
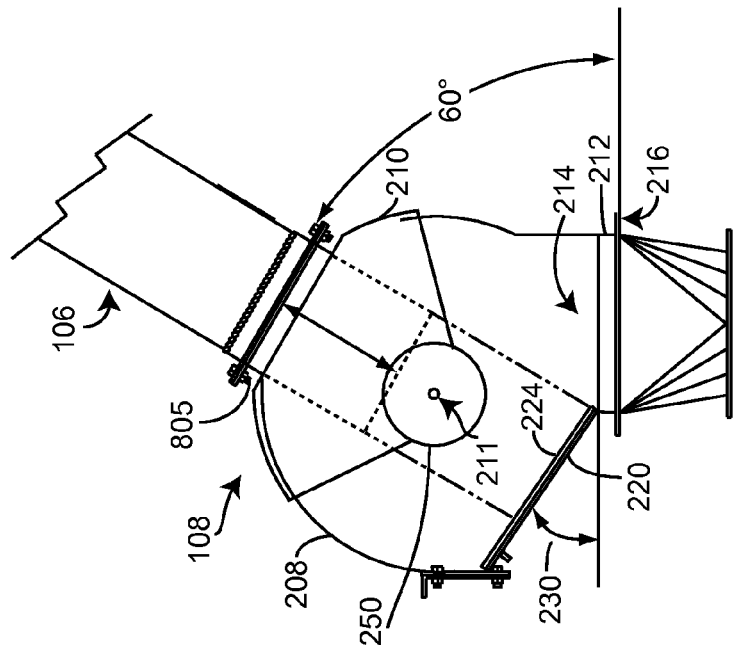
FIG. 3 is a more detailed partially cut-away view of the adjustable spout end 108 of FIG. 1, which is deployed at an angle different from that of FIG. 2.

Now referring to FIG. 3, there is shown a view of the spout 108 in a different angular orientation as FIG. 2. The dotted and dashed lines show the projection of the end of angled gravity flow down spout 106.

Figure 4:
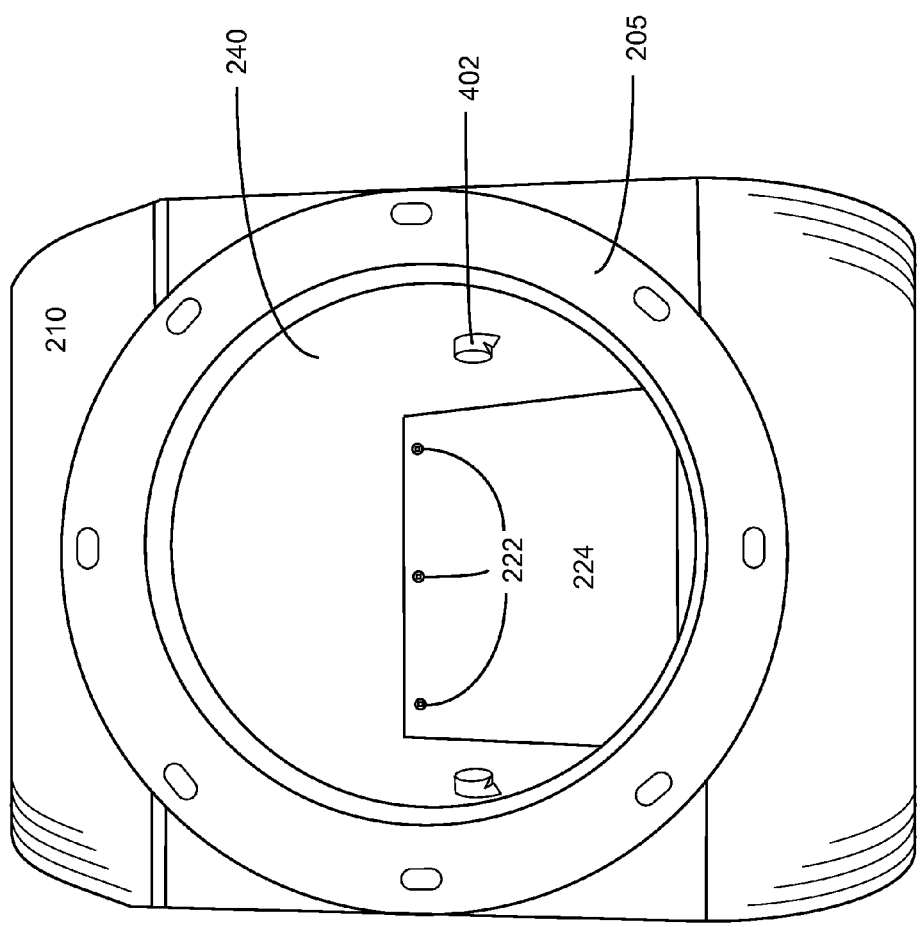
FIG. 4 is a perspective representation of a top view of the adjustable spout end 108 of FIGS. 1, 2 and 3 which reveals the wear plate.

Now referring to FIG. 4, there is a is a perspective representation of a top view of the adjustable spout end 108 of FIGS. 1, 2 and 3 which reveals the wear plate 224, wear plate fasteners 222 and the tensioning nut 402.

Now referring to FIG. 5, there is shown an exploded view of the spout 108 of FIG. 2 which shows the wear plate 224 and fasteners 222 after they have been removed from the opening which was exposed by the removal of access door 240.

Throughout this description, reference is made to grain, grain handling, grain elevators, grain bins and to feed and feed mills, because it is believed that the beneficial aspects of the present invention would be most readily apparent when used in connection with grain and feed; however, it should be understood that the present invention is not intended to be limited to grain and feed handling and should be hereby construed to include other agricultural and non-agricultural applications as well. For example only, and not intended as a limitation, the dry bulk material may be corn, soybeans, wheat, rice, almonds, walnuts, peas, coffee beans, paint pigment, or any free-flowing dry bulk material. The term "dry bulk material" is intended to refer to the above-listed materials and other materials having similar properties. The term "baffle" shall hereby be defined herein to mean a structure which is located in a material flow path and is designed to alter the velocity of material through a spout and simultaneously allows material to flow on at least two sides thereof. Impact side 220 is by definition NOT a baffle because material can flow only on one side thereof.

In operation, the bulk material delivery system of the present invention could be assembled as follows:

1. An angled gravity flow down spout 106 is coupled at its upper end to a source of dry bulk material.

2. Angled gravity flow down spout 106 is coupled to adjustable spout 108.

3. Adjustable spout end main body sliding top section 210 is pivoted about pin 211 so as to provide the proper angle between angled gravity flow down spout 106 and the top of grain bin 104.

4. The adjustable spout end 108 is attached to the top of grain bin 104.

5. The nut on pin 211 is tightened to prevent unwanted pivoting of adjustable spout end main body sliding top section 210.

6. An appropriate wear pad 224 is inserted into adjustable spout end main body 208 through the access door 240 and attached over the impact side 220 with wear pad fasteners 222.

In operation, the bulk material delivery system 100 of the present invention could be at least partially maintained as follows:

To extend the life of angled gravity flow down spout 106, it may need to be rotated. The process for rotating angled gravity flow down spout 106 could be accomplished as follows:

1. Angled gravity flow down spout 106 is detached at its top end from elevated position 102.

2. Angled gravity flow down spout 106 can be rotated without the need for detaching the bottom of angled gravity flow down spout 106 for adjustable spout end 108.

3. The angled gravity flow down spout 106 can then be reattached at the elevated position 102.

4. To extend the life of adjustable spout end 108 the access door 240 can occasionally be removed and the condition of wear pad 224 can be inspected. If necessary wear pad 224 could be replaced.

The life of the system could be increased by matching an appropriate wear pad 224 to the material which is flowing through the adjustable spout end 108 and changing the wear pad 224 every time that a substantially different material is caused to flow through the adjustable spout end 108.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A method of extending a useful life characteristic of an angled gravity flow down spout having a top end and a bottom end and a circular cross-section, said spout extending between an elevated position and a storage bin, the method comprising the steps of:
    removing an access door, where said access door is configured to selectively cover an access void into an adjustable spout end main body, which has adjustable differences between the input angle into the adjustable spout main body and an exit angle from the adjustable spout main body;
    inspecting, through said access void, a status of a wear pad disposed on a impact side in a trajectory of dry bulk flowing material;
    in response to said step of inspecting, removing, through said access void said wear pad and replacing it with a replacement wear pad; and
    changing said dry bulk flowing material from a first material to a second material where said second material has substantially different characteristics with respect to potential for damaging said wear pad.

2. A method of extending a useful life characteristic of an angled gravity flow down spout having a top end and a bottom end and a circular cross-section, said spout extending between an elevated position and a storage bin, the method comprising the steps of:
    removing an access door, where said access door is configured to selectively cover an access void into an adjustable spout end main body, which has adjustable differences between the input angle into the adjustable spout main body and an exit angle from the adjustable spout main body;
    inspecting, through said access void, a status of a wear pad disposed on a impact side in a trajectory of dry bulk flowing material;
    in response to said step of inspecting, removing, through said access void said wear pad and replacing it with a replacement wear pad; and
    changing said wear pad depending upon a change in an angle of said angled gravity flow down spout.

3. A method of extending a useful life characteristic of an angled gravity flow down spout having a top end and a bottom end and a circular cross-section, said spout extending between an elevated position and a storage bin, the method comprising the steps of:
    removing an access door, where said access door is configured to selectively cover an access void into an adjustable spout end main body, which has adjustable differences between the input angle into the adjustable spout main body and an exit angle from the adjustable spout main body;
    inspecting, through said access void, a status of a wear pad disposed on a impact side in a trajectory of dry bulk flowing material;
    in response to said step of inspecting, removing, through said access void said wear pad and replacing it with a replacement wear pad; and
    changing said wear pad depending upon a change in velocity of dry bulk material flowing through said angled gravity flow down spout.

4. A method of extending a useful life characteristic of an angled gravity flow down spout having a top end and a bottom end and a circular cross-section, said spout extending between an elevated position and a storage bin, the method comprising the steps of:
    removing an access door, where said access door is configured to selectively cover an access void into an adjustable spout end main body, which has adjustable differences between the input angle into the adjustable spout main body and an exit angle from the adjustable spout main body;
    inspecting, through said access void, a status of a wear pad disposed on a impact side in a trajectory of dry bulk flowing material;
    in response to said step of inspecting, removing, through said access void said wear pad and replacing it with a replacement wear pad; and
    changing said wear pad depending upon a change in at least two of:
        an angle of said angled gravity flow down spout;
        a velocity of dry bulk material flowing through said angled gravity flow down spout; and
        a substantially different characteristic in two successive dry bulk flowing materials with respect to potential for damaging said wear pad.

5. A dry bulk material delivery system comprising:
    means for transporting dry bulk material from an elevated position to a lower position;
    means for containing dry bulk material, where dry bulk material is fed therein via an input port therein;
    an adjustable spout, which is free of any baffles therein, said adjustable spout comprising:
        means for changing a flow direction of dry bulk material subsequent to entering said adjustable spout and prior to exiting said adjustable spout, without utilizing any baffles;
        means for allowing access to said means for changing a flow direction inside of said adjustable spout;
        reusable means for readily coupling said means for changing a flow to and for readily decoupling said means for changing a flow from to said adjustable spout;
        wherein said means for changing a flow comprises multi-layer member comprising different layers of material having substantial chemical dissimilarities.

6. The system of claim 5 wherein one layer of said multi-layer member is a rubbery layer.

* * * * *